United States Patent [19]

Marshall et al.

[11] 4,312,327
[45] Jan. 26, 1982

[54] SOLAR ENERGY TRACKING AND COLLECTOR APPARATUS

[76] Inventors: Clair B. Marshall, Star Rte. Box 21a, Isle, Minn. 56342; Larry A. Marshall, Rte. 3, Box 222, Onalaska, Wis. 54650

[21] Appl. No.: 203,321

[22] Filed: Nov. 3, 1980

Related U.S. Application Data

[63] Continuation of Ser. No. 31,217, Apr. 18, 1979, abandoned.

[51] Int. Cl.³ .............................................. F24J 3/02
[52] U.S. Cl. .................... 126/424; 126/438; 126/449
[58] Field of Search ............. 165/179, 173; 126/424, 126/425, 438, 439, 443, 446, 449, 417

[56] References Cited

U.S. PATENT DOCUMENTS

| | | | |
|---|---|---|---|
| 2,480,706 | 8/1949 | Brinen | 126/446 |
| 3,915,147 | 10/1975 | Rineer | 126/438 |
| 3,990,430 | 11/1976 | Robertson | 126/438 |
| 4,068,653 | 1/1978 | Bourdon et al. | 126/439 |
| 4,092,979 | 6/1978 | Kotlarz | 126/438 |
| 4,116,221 | 9/1978 | Zaugg et al. | 126/438 |
| 4,138,994 | 2/1979 | Shipley | 126/438 |
| 4,138,997 | 2/1979 | Laporte et al. | 126/446 |
| 4,149,523 | 4/1979 | Boy-Marcotte et al. | 126/425 |
| 4,184,895 | 1/1980 | Oster | 126/438 |
| 4,193,391 | 3/1980 | White | 126/438 |

Primary Examiner—Daniel J. O'Connor
Attorney, Agent, or Firm—Wicks & Nemer

[57] ABSTRACT

An apparatus for tracking and collecting solar energy including at least one collector having elongated reflective surfaces which are parabolic in cross-section. A heat collection and transfer conduit is carried by said collector with said conduit having an inlet at one end and an outlet at the other end. The inlet is connected to an inlet manifold and the outlet is connected to an outlet manifold. An agitator moves a fluid through the inlet manifold, the conduit for warming then through said outlet manifold. The collector is rotated about a longitudinal axis thereof with such rotation directed by a sun sensing device.

9 Claims, 19 Drawing Figures

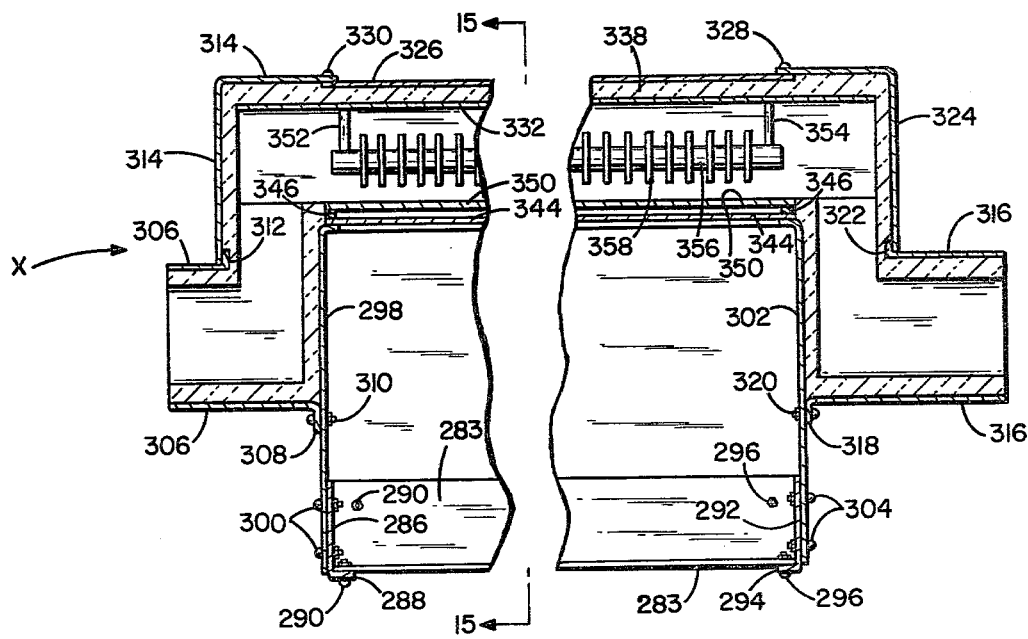
FIG. 14
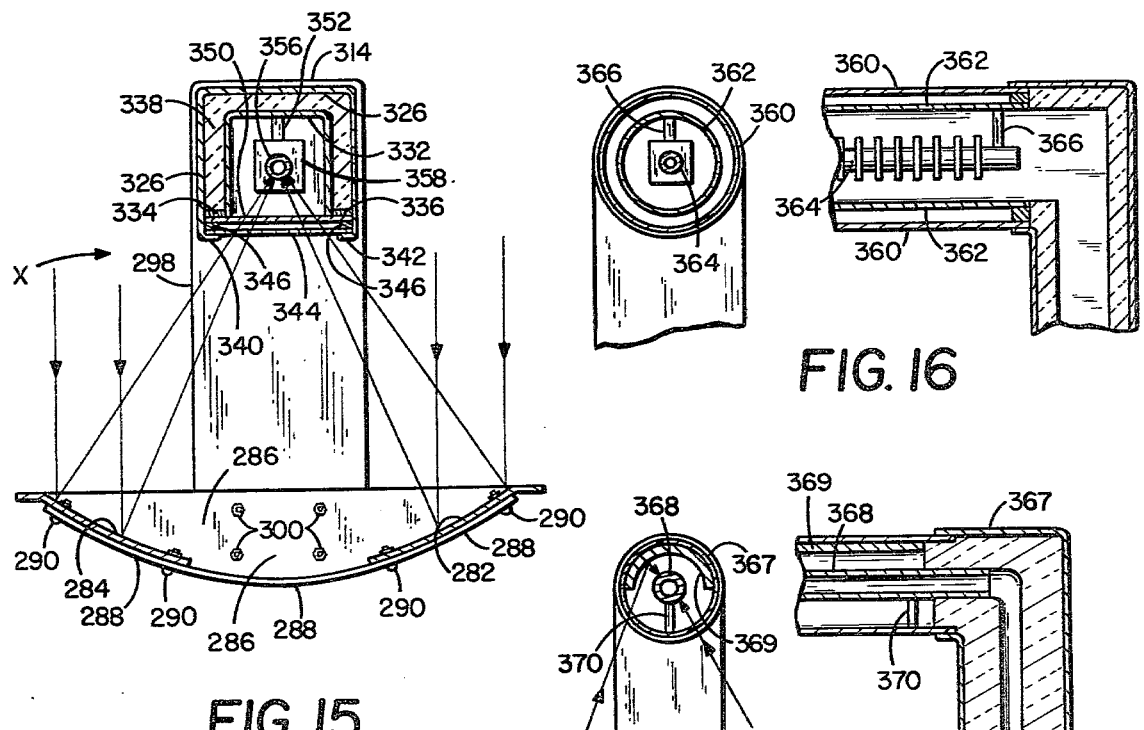
FIG. 15
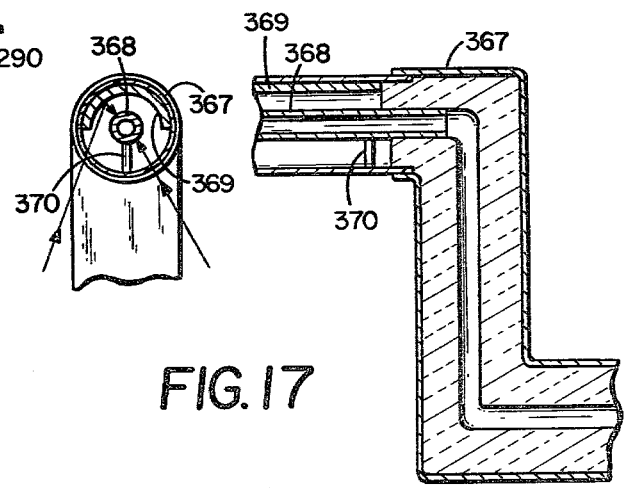
FIG. 16
FIG. 17

SOLAR ENERGY TRACKING AND COLLECTOR APPARATUS

CROSS REFERENCE

This is a continuation of application Ser. No. 31,217 filed Apr. 18, 1979, now abandoned.

SUMMARY

The invention relates to an improvement in an apparatus for collecting and tracking solar energy.

It is an object of the invention to provide a collector having elongated reflective surfaces which are parabolic in cross-section. Such surfaces collect, reflect and focus the sun's rays on an absorber member within a conduit adjacent the reflective surfaces. A fluid is conducted from an intake manifold through the conduit and in contact with the absorber where it is warmed and out through an outlet manifold from which it is directed to a heat storage device or directly into a building or other structure to supply heat to the same. The collector is rotated about a longitudinal axis thereof with such rotation directed by a sun sensing device.

The conduit confines the heated fluid in a relatively small area allowing efficient collection and transfer of heat. The elongated parabolic surfaces provide a new and unique collector for solar heat directed to a conduit adjacent the area of the focus of the rays from the reflective surfaces, the conduit collecting the heat for transfer therefrom. The apparatus includes one or more collectors in series or parallel which are encased within a housing that confines the collected heat issuing from the apparatus for distribution therefrom. The apparatus using air is particularly adaptable to and highly desirable for easy use with forced air heating systems which already exist.

The invention also includes a new and unique opposed reflector construction, transparent collection conduit and finned absorber transfer element.

The invention will appear more clearly from the following detailed description when taken in connection with the accompanying drawings, showing by way of example of preferred embodiment of the inventive idea wherein like numerals refer to like parts throughout.

In the drawings forming part of this application:

FIG. 14 is a longitudinal sectional view of a further embodiment of the invention.

FIG. 15 is a sectional view on the line 15—15 of FIG. 14.

FIG. 16 is a partial transverse sectional view of a variation on the energy collection conduit of FIGS. 14 and 15.

FIG. 17 is a partial transverse sectional view of a further embodiment of the invention.

Figure 1:
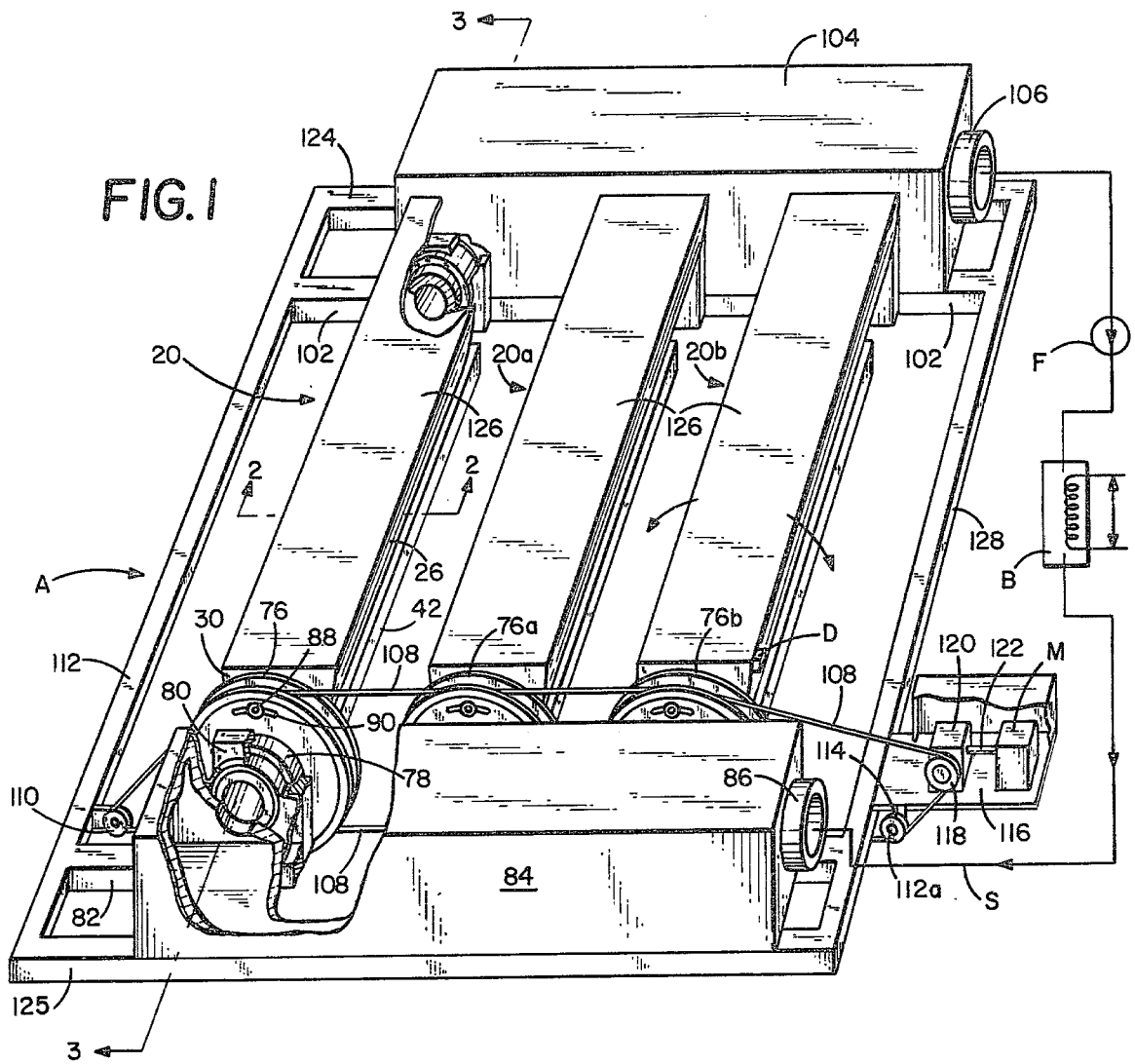
FIG. 1 is a perspective view of a solar energy tracking collector apparatus embodying one form of the invention.

Referring to the drawings in detail the apparatus A includes the collector 20 which includes a first elongated reflective member 22 having an internal parabolic reflective surface 24 in cross section. Also provided is a second elongated reflective member 26 identical to member 22 and having an internal parabolic reflective surface 28 in cross section, FIGS. 1, 2, and 3 in particular. The reflective members 22 and 26 are held in parallel spaced opposed relationship by connection with first and second end members 30 and 32. Each of the lower edges of the members 22 and 26 is formed with the flange 34 and 36 connected to the flanges 38 and 40 of the outer channel-shaped elongated housing 42 by means of bolts 43. The housing 42 includes the sidewalls 44 and 46 on the upper edges of which the flanges 38 and 40 are formed, and the lower edges of the sidewalls are connected by the bottom 48.

The numeral 50 designates an inner channel-shaped elongated housing spaced inwardly of the outer housing 42. The inner housing 50 includes the sidewalls 52 and 54 joined at the bottom by the bottom wall 56. Positioned between the inner and outer channel walls is the insulation material 58. Secured to the top edges of the walls 52 and 54 of the inner channel housing 50 are the spaced transparent plates 60 and 62 between which is provided an insulating dead air or evacuated space and which also forms a heat collection and transfer conduit C below the plates and within the inner housing 50, the sun's rays indicated in FIG. 2 as focusing within the conduit C and at or adjacent the support 64 and adjacent the lower edges of the members 22 and 26.

Positioned on and spaced from the bottom 56 of the inner channel housing 50 is a support in one form of tube 64 mounted on the legs 66 and 68 secured to the bottom 56. The support 64 has mounted thereon the spaced fins 70 which have a dark solar energy absorbing surface. The fins provide a heat absorber element. The conduit C and the support and fins 70 form means for collecting and transferring energy reflected from the members 22 and 26.

The conduit C terminates at one end at the top in the oblique wall 72 which is connected to the end wall 30 adjacent the tubular inlet opening 74 formed in the end wall 30. Secured to the end wall 30 is the pulley 76 which has the bearing 78 also mounted on the bracket 80 which is mounted on the longitudinal frame member 82, FIGS. 1 and 3 in particular. The inlet opening 74 communicates with the inlet manifold 84 secured to bracket 80. Formed on one end of the manifold 84 is the inlet 86 which is connected to an air supply source from, for example, the heat bin B. A fluid in the form of a liquid may also be pumped through the conduit C completely surrounding the fins 70 and thence to and through the manifolds to a storage bin or directly to a heat dispensing or using apparatus. The collector 20 is adjustably positioned relative to the pulley 76 by means of the nut-equipped bolt 88 operable in the slot 90 formed in the pulley and connected to the end wall 30.

Figure 2:
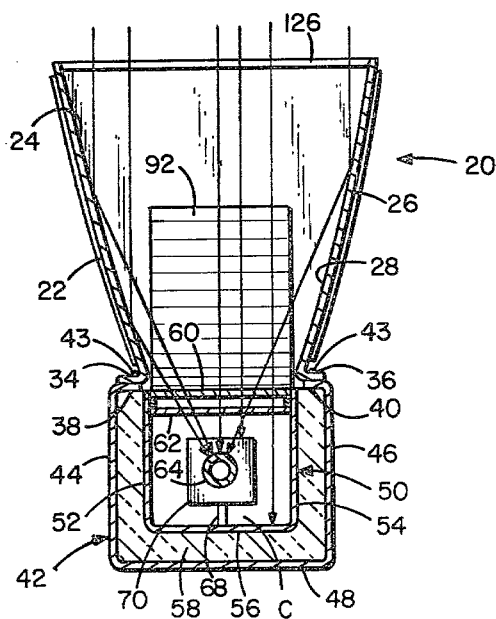
FIG. 2 is a sectional view on the line 2—2 of FIG. 1.
Figures 3, 4, 4B:
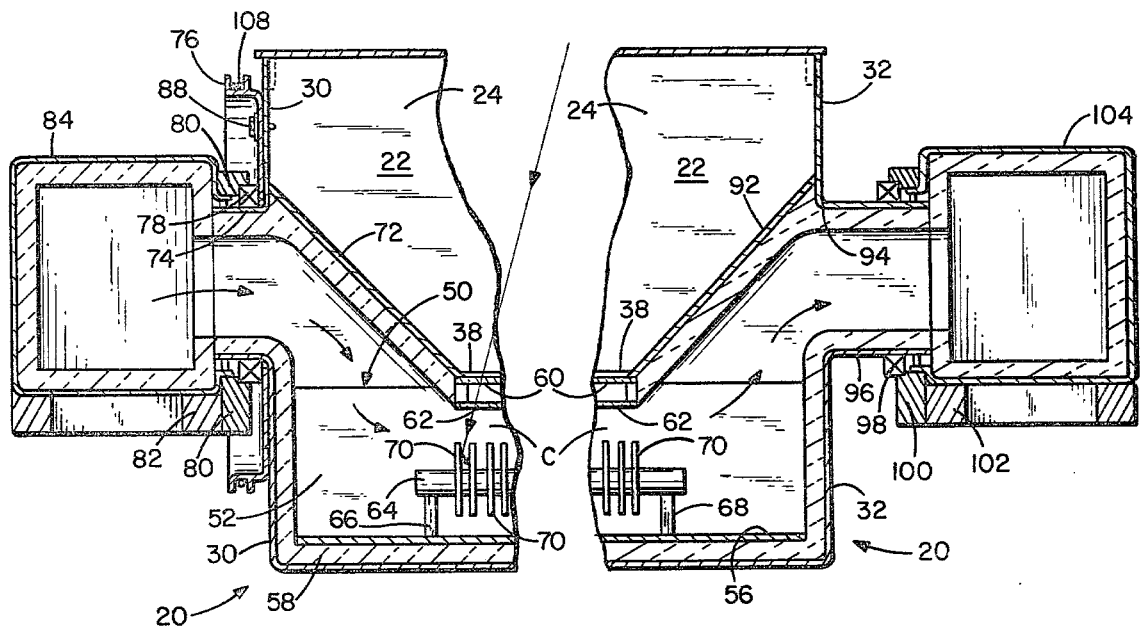
FIG. 3 is a sectional view substantially on the line 3—3 of FIG. 1, a portion of the same being broken away.
FIG. 4 is a view similar to that of FIG. 3 with a liquid conductor, portions of the same being broken away.
FIG. 4b is a side elevational view of the tube of FIG. 4 but with fins attached thereto.

The heat transfer conduit C terminates at the other end at the top in the oblique wall 92, FIGS. 2 and 3, which is connected to the end wall 32 adjacent the outlet opening 94 formed in the wall 32. The tubular extension 96 of opening 94 is rotatably mounted in the bearing 98 mounted in the support bracket 100 secured to the frame member 102. The outlet extension 96 communicates with the outlet manifold 104, and formed on one end of the manifold 104 is the outlet 106 which is connected to, for example, the heat bin B as a supply line. A fluid such as air in the case of an air system is moved therethrough by a fan F which directs heated air to the bin B and draws air from the bin to the manifold 84 and thence through the collectors to manifold 104.

Illustrated in FIG. 1 are three collectors each identical to collector 20 with identical parts bearing identical reference numerals but accompanied by a lower case letter a or b.

The numeral 108 designates a cable which is wound once around pulley 76b and then once around pulley 76a and then once around pulley 76 from which it is passed over pulley 110 mounted on the end frame member 112. The cable 108 extends from pulley 110 below the pulleys 76, 76a and 76b to pulley 112a mounted on bracket 114 connected to platform 116 from which the cable passes over pulley 118 mounted on a shaft extended from the gear reduction box 120 which is driven by the motor M by means of the coupling shaft 122. With the above apparatus all of the collectors are moved in unison.

Additionally provided is a conventional sun tracking device D such as made by Energy Application Co. of Rutherfordton, N.C., model ST-100. The device D is mounted on the side of a collector such as 20b nearest the motor M which rotates the collectors relative to the movement of the sun whereby the collectors receive the direct rays from the sun with constant orientation with respect to the sun. When the sun's rays are not directly upon the tracking device D, the motor is actuated thereby rotating the collectors to a position when the sun's rays are direct into the device D, and as a result the motor M is deactivated. The procedure is continued whereby the collectors follow the sun for maximum collection and concentration of the sun's rays into the collectors. Each collector has a transparent top plate 126 which keeps the reflective members 22 and 26 free from contamination.

Figure 11:
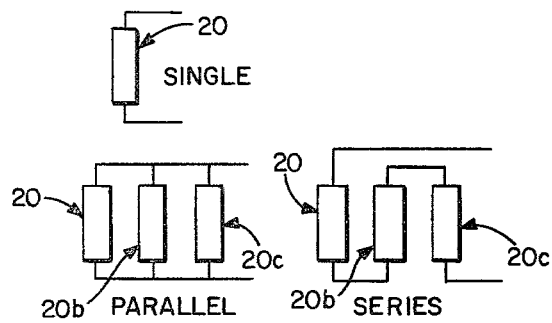
FIG. 11 is a diagrammatic view of the collector units mounted singly, in parallel and in series.

The frame member 112 is connected at the ends to the longitudinal frame members 125 and 124 and also to frame members 102 and 82. The other ends the members are connected to the transverse frame member 128. The collectors may be mounted with the longitudinal axis thereof either approaching horizontal or approaching vertical. The collectors may also be connected in parallel or series as indicated in the line drawing of FIG. 11.

OPERATION

In the operation of the device the collectors collect the sun's rays as hereinafter described. Referring in particular to FIG. 2, the sun's rays enter the collector 20 striking the parabolic surface whereby the rays are reflected to a focal point adjacent the parabolic reflective members and within the conduit C, the focal point of all the reflected rays off the parabolic surfaces 24 and 28 being adjacent the support 64 and within and adjacent the fins thereof. Due to the unique fin arrangement on the absorber the rays are substantially absorbed as they bounce between the fins as shown in FIGS. 2, 3, and 4b. As a result concentration heat energy is generated and confined within the conduit C, and due to the fan F the air passing through the conduit by fan F is heated by the transfer of heat energy through radiation, conduction, convection and contact with and from the absorber member and transferred therefrom to the heat bin. Heat can be moved from the heat bin B by conventional methods to the interior of a building or other structure to heat the same. The heat bin can be located either adjacent the collector apparatus, within the building structure or outside thereof. Additionally, heated air from the system can be directed directly into a building structure without the heat bin or to a heating apparatus not shown.

Figure 5:
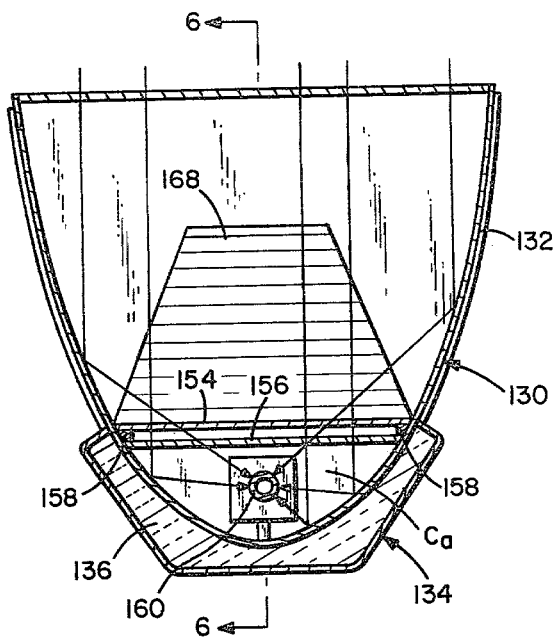
FIG. 5 is a transverse sectional view through a further embodiment of a collector unit.
Figure 6:
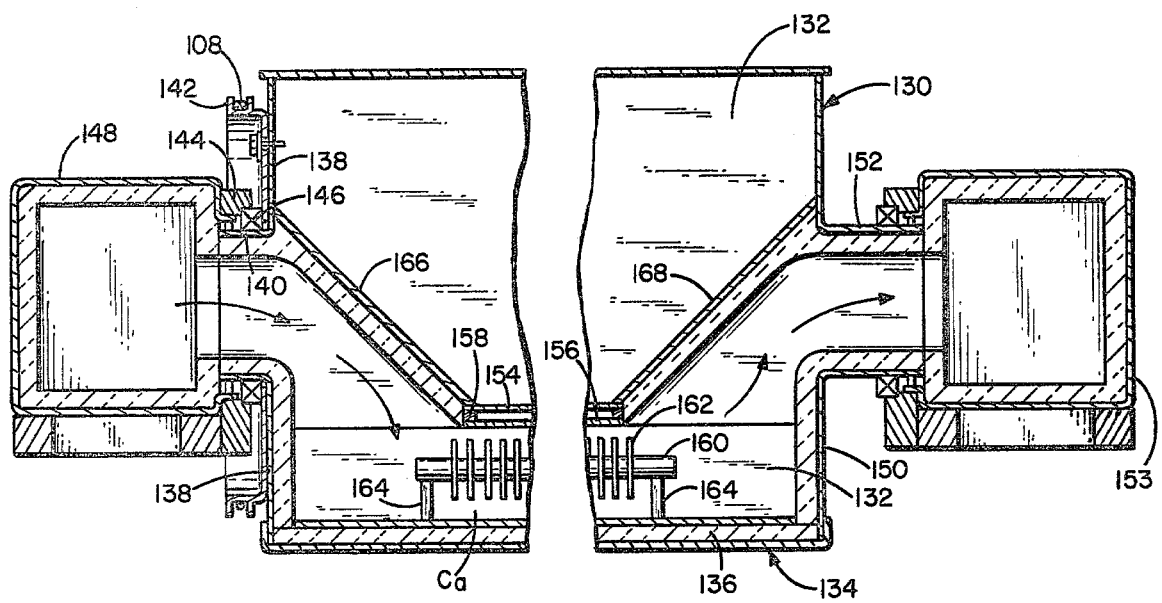
FIG. 6 is longitudinal sectional view of the embodiment of FIG. 5 a portion of the same being broken away.

A further embodiment of the invention is found in FIGS. 5 and 6 wherein the collector 130 includes the elongated parabolic reflector 132. Secured to outer bottom of the reflector 132 is the jacket 134 within which is mounted the insulation 136. One end of the jacket is connected to the end wall 138, the end wall having the tubular inlet 140. Connected to the end wall 138 is the pulley 142, and mounted between the support bracket 144 and the end wall is the bearing 146 mounted on the inlet 140 whereby the collector 130 can be rotated on its longitudinal axis. The support bracket 144 is identical to bracket 80 as in FIGS. 1 and 3, and the collector is rotated by means identical to that for rotating collector 20 of FIGS. 1a and 3. The inlet 140 communicates with the manifold 148 identical to manifold 84 and the function thereof.

The other end of the jacket 134 is connected to the end wall 150, the end wall having the tubular outlet 152 which communicates with the manifold 153 which operates in the same manner as manifold 104. The outlet 152 is rotatably mounted on a support identical to that found in FIG. 3.

Further provided are the transparent plates 154 and 156 spaced by the spacer element 158, the plates being secured to the parabolic reflector by conventional means which provides an insulating space similar to the plates 60 and 62 in FIG. 2. The plates together with the reflector form a conduit Ca through which there is a flow transfer of heat generated within the conduit Ca. The numeral 160 designates a support on which is mounted fins 162 identical to the fins on support 64 and it is supported by a pair of spaced legs 164 on the bottom of the reflector, FIG. 6.

A baffle 166 extends from the ends of the plates 154 and 156 to the end wall 138, and the baffle 168 extends from the other ends of the plates 154 and 156 to the end wall 150.

Figure 7:
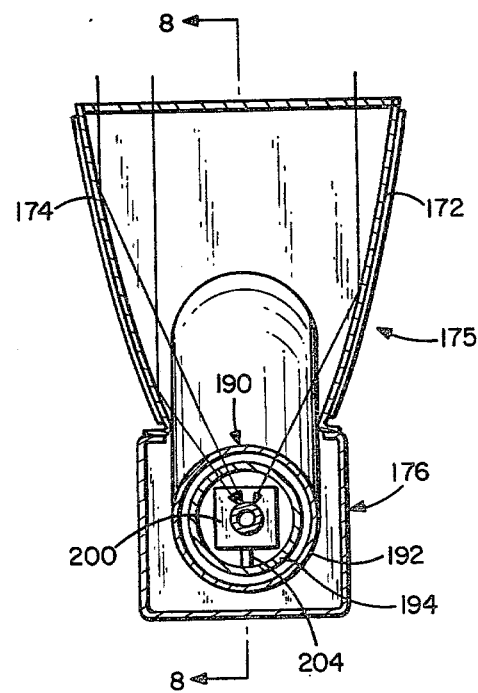
FIG. 7 is a transverse sectional view through a further embodiment of a collector unit.
Figure 8:
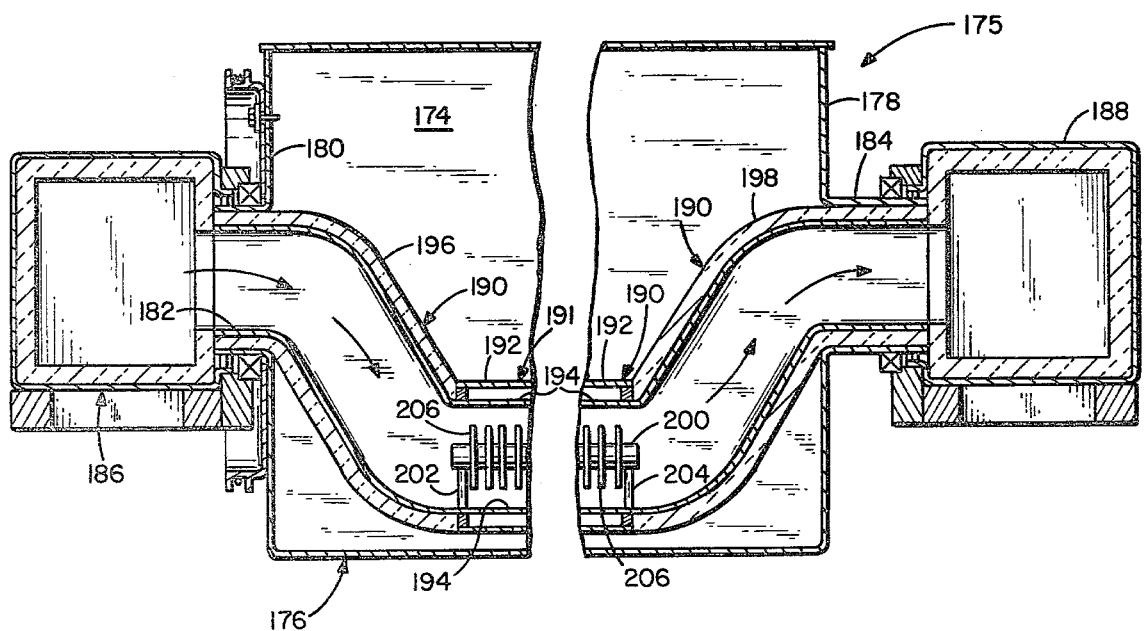
FIG. 8 is a longitudinal sectional view of the embodiment of FIG. 7.

A still further embodiment of the invention is found in FIGS. 7 and 8 wherein the parabolic reflectors 172 and 174 of the collector 175 and the housing 176 are identical to the reflectors 22 and 26 and the housing 42, respectively. The reflectors 172 and 174 are connected to end walls 178 and 180, and from end wall 180 there extends the tubular inlet 182 and the tubular outlet 184 extends from the end wall 178. The inlet 182 is connected to the manifold 186 and the outlet 184 is connected to the manifold 188. The collector 175 operates and is rotated by bearings, supports and a pulley-cable construction identical to that of FIGS. 1 and 3. Further provided is the conduit 190 which includes the central portion 191 having the spaced transparent cylindrical walls 192 and 194 which at one end are connected to the first double elbow 196 connected to the inlet 182 and at the other end to the second double elbow 198 connected to the outlet 184. Positioned within the central portion 191 is the support 200 mounted on the legs 202 and 204 mounted on the wall 194 with the support mounting the spaced rectangular fins 206. Air is transferred to and from the collector 175 as in the case of collector 20. A fluid in the form of a liquid may be pumped through the tube 194 completely surrounding the fins 206 and thence to and through the manifolds to a storage bin or directly to a heat dispensing or using apparatus.

Figure 4A:
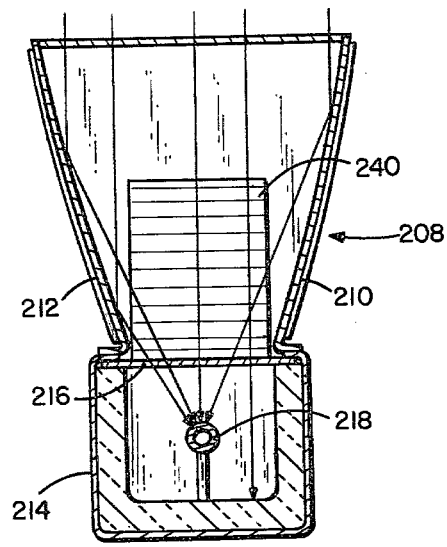
FIG. 4a is a transverse sectional view through the device of FIG. 4.

A further embodiment of the invention is disclosed in FIGS. 4 and 4a wherein is found the collector 208 which includes the spaced parabolic reflectors 210 and 212 and the housing 214 identical to reflectors 26 and 22 and housing 42, respectively. At the inner edges of the reflectors is mounted the single transparent plate 216. Mounted substantially centrally of the housing 214 is the energy absorbing and liquid transfer tube 218. Connected at one end of the tube 218 is the first double elbow 220 which is connected at the other end to the conventional swivel connector 222 positioned at the inner sidewall of the manifold 224 and connected to the pipe 226 which in turn is connected to the inlet manifold pipe 228. The collector 208 is rotated at each end by elements identical to those shown in FIG. 3.

The other end of the tube 218 is connected to the second double elbow 230 which is connected at the other end to the conventional swivel connector 232 positioned at the inner sidewall of the manifold 234 and connected to the pipe 236 which in turn in connected to the outlet manifold pipe 238. Connected to the plate 216 at one end is the baffle 240 with the other end of the baffle connected to the end wall 242. A further baffle 244 is provided which is connected at one end to the plate 216 and at the other end to the end wall 246. The housing 214, the manifolds 224 and 234 together with the space under the the baffles 240 and 244 may be filled with insulation such as fiberglass, styrofoam or the like as shown in diagonal lines. A liquid is moved through tube 218 by means of a conventional pump hookup, similar to the position of the fan F as in FIG. 1.

FIG. 4b shows the tube 218 of FIGS. 4 and 4a with fins 219 mounted thereon substantially normal to the longitudinal axis of the tube 218 whereby each individual fin absorbs the sun's energy and transfers it substantially all around the tube.

A further embodiment of the invention is submitted wherein the finned tube 160 of FIG. 5 is replaced by a liquid transporting tube with insulation, and manifolds as in FIG. 4 whereby liquid in the liquid transporting tube absorbs the collected energy and transports it to storage means similar to that shown in storage bin of FIG. 1 directly to a building or heating apparatus not shown.

An additional embodiment of the invention is submitted wherein the finned tube 200 of FIGS. 7 and 8 is replaced by a liquid transporting tube with insulation and manifolds as in FIG. 4 whereby liquid in the liquid transporting tube absorbs the collected energy and transports it to a storage means similar to that shown in FIG. 1 or directly to a building or a heating apparatus not shown.

Figure 9:
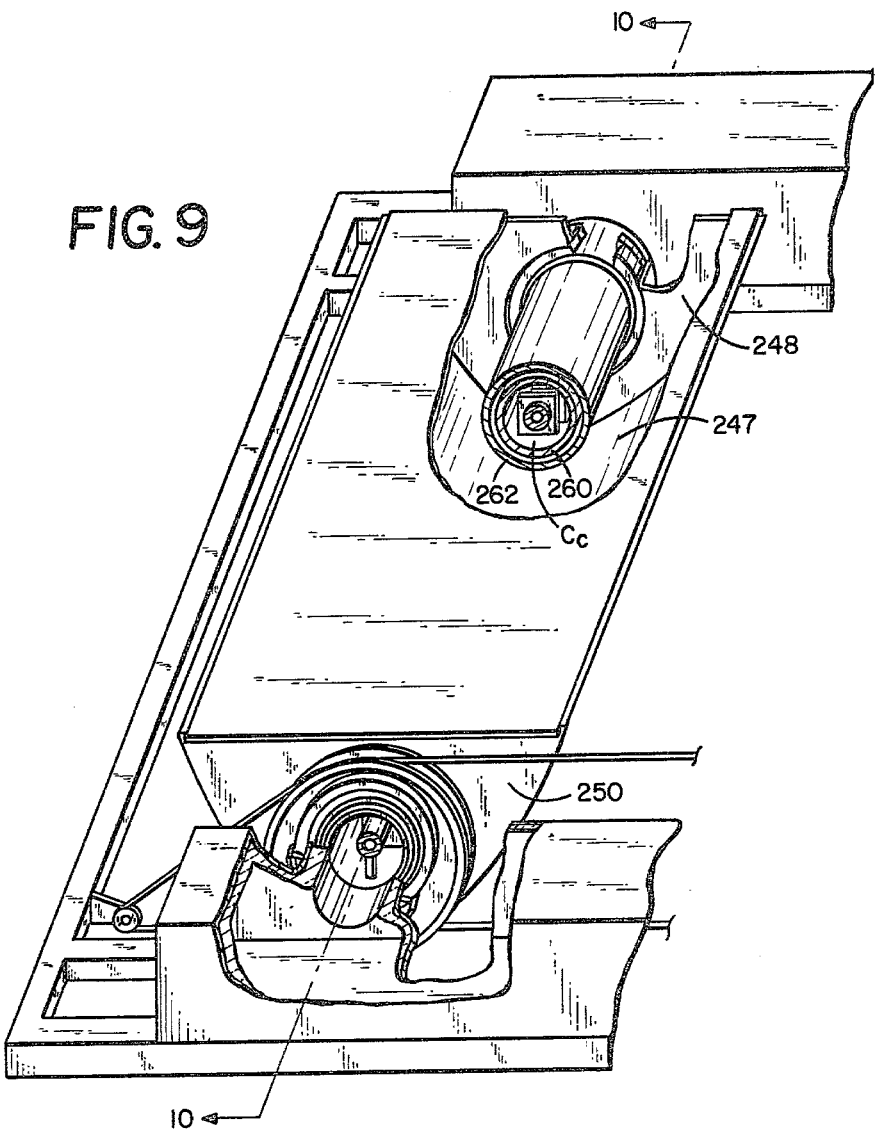
FIG. 9 is a perspective view of a further embodiment of a collector unit a portion of which is broken away.
Figure 10:
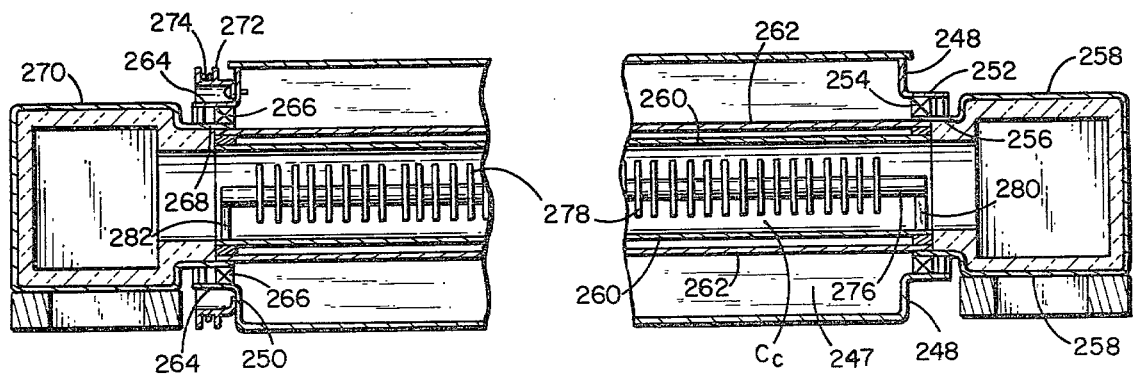
FIG. 10 is a longitudinal sectional view on the line 10—10 of FIG. 9.

A still further embodiment of the invention is found in FIGS. 9 and 10 wherein there is provided the elongated single piece parabolic reflector 247 having the end walls 248 and 250. The end wall 248 is formed with the outlet tubular formation 252 within which is mounted the bearing 254 mounted on the extension 256 of the manifold housing 258. Connected at one end to the inner surface of the extension 256 of manifold 258 are the spaced and transparent stationary tubular members 260 and 262 which form a conduit Cc. The other ends of the tubular members 260 and 262 are connected to the inner surface of the extension 268 of the manifold 270.

The end wall 250 is formed with the outlet tubular formation 264 upon which is mounted the bearing 266 mounted on the tubular extension 268 of the manifold housing 270. As a result of the above construction the collector member 247 is rotatable about the stationary tubular members 262 and 260 by means of the pulley 272 and cable 274 in the manner with construction shown in FIG. 1. Positioned axially within the tube 260 is the support 276 on which are mounted the heat collecting and transferring fins 278. The support 276 is mounted on the legs 280 and 282 mounted on the tube 260. A liquid or air may be passed through the tube 260 where it picks up the sun's rays focused upon the tube.

The apparatus such as A may be attached to a building or other using device or as a unit separate from same. Further the collectors may be mounted vertically, stacked horizontally or spaced horizontally.

Figure 12:
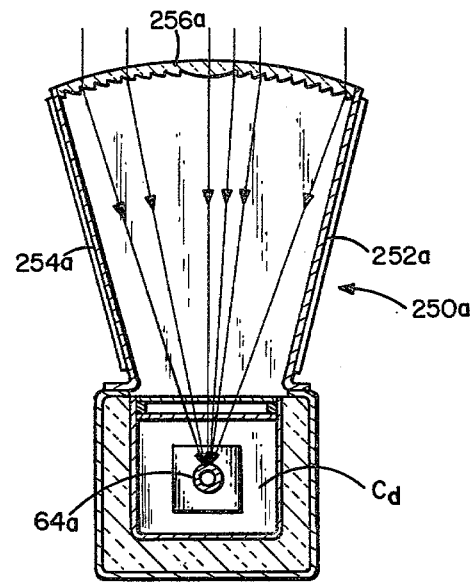
FIG. 12 is a sectional view through a further embodiment of the invention.

FIG. 12 illustrates a further embodiment of the invention wherein is found collector 250a which is substantially identical to that of FIG. 2 but without the parabolic reflective side members. The side members 252a and 254a of FIG. 12 are flat. Secured to the top edges of the side members 252a and 254a is a conventional elongated freznel type lens 256a which focuses the sun's rays to the support 64a identical to support 64 of FIG. 2 whereby heat collected in the conduit Cd as in the case of conduit C of FIG. 2 can be transferred as described with regard to the apparatus of FIGS. 1, 2 and 3.

Figure 13:
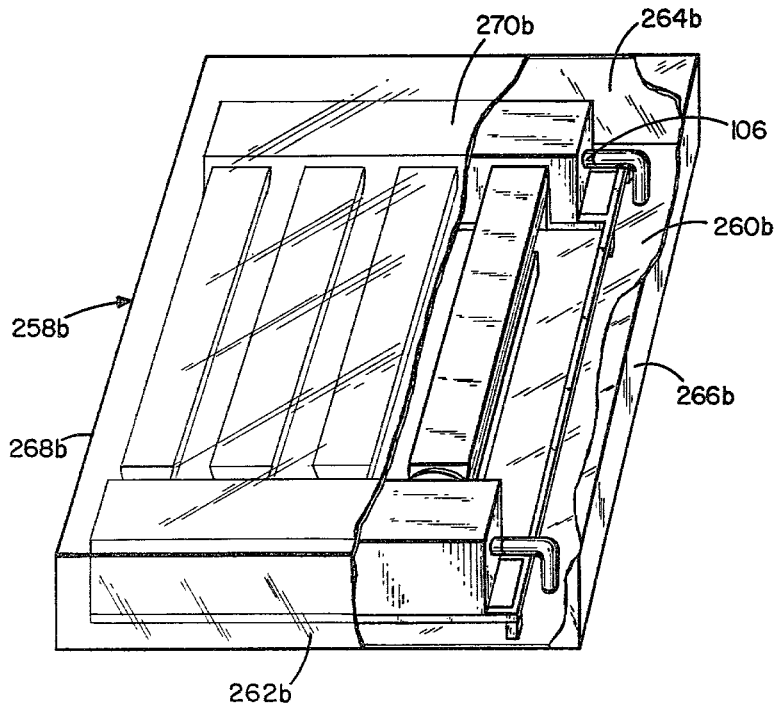
FIG. 13 is a perspective view of a casing enclosing the apparatus of FIG. 1-3.

FIG. 13 illustrates a perspective view of a housing 258b in which the tracking and collector apparatus particularly of FIG. 1 and other described apparatus is housed. The housing 258b includes the bottom member 260b connected to the side members 262b and 264b and end members 266b and 268b. A top member 270b is connected to the side and end members. The top member 270b is transparent to allow the sun's rays to enter the housing 258b and strike the collector members therein. Also the end members 166b and 268b and the side member 262b are transparent to allow the sun's rays to enter the casing. The side member 264b is opaque and painted black on the inner surface for the greatest amount of absorption of the sun's rays. Additionally, the interior surface of the bottom 260b is colored for maximum absorption of the sun's rays.

With the housing 258b enclosing the entire apparatus the heat received by the apparatus is not dissipated therefrom and it has been found that the temperature of heated air issuing from the outlet 106 is substantially increased.

In FIGS. 14 and 15 is disclosed a collector X, including a pair of spaced parabolic elongated reflectors 283 and 284. Further provided is a first reflector end support 286 having a right angular lip 288 to which a first end of the reflector 283 is secured by the bolts 290. The other end of the reflector is connected to a second end support 292 having a right angular lip 294 to which the second end of the reflector 283 is secured by the bolts 296.

The numeral 298 designates a first hanger to which said first reflector and support 286 is connected by means of the bolts 300. The second reflector end support 292 is connected to a second hanger 302 by means of the bolts 304. Further provided is the tubular inlet 306 secured to the hanger 298 by means of the flange 308 secured by the bolt 310 and the flange 312 welded to the lower end of the first right angular housing end piece 314.

The numeral 316 designates a tubular outlet secured to the hanger 302 by means of the flange 318 secured by the bolt 320 and the flange 322 welded to the lower end of the second right angular housing end piece 324.

Further provided is an outer housing channel member 326 secured by sheet metal screws 328 and 330 to the ends of the end pieces 324 and 314 respectively. Also provided is the inner housing channel member 322 having the flanges 334 and 336 on the outer edges thereof and positioned between the channel members is the insulation 338 which extends behind the housing end pieces 314 and 324 and the inlet 306 and outlet 316 together with the hangers 298 and 302. The outer sides of the outer channel member 326 are formed with the flanges 340 and 342 on which is positioned the bottom clear plate 344. Positioned on the plate 344 are the spaced spacers 346 upon which is positioned the upper clear plte 350 which forms an insulating dead air space but which allows passage of the sun's rays directed from the reflectors.

Secured to the underside of the channel member 332 are the hanger members 352 and 354 to which is connected the tubular support 356 on which are mounted the spaced fins 358 which are coated with a dark sun ray absorbing medium. The collector X is rotatably mounted by means of the inlet and outlet in the same manner as the collectors shown in FIGS. 1 and 3.

In FIG. 16 is shown a variance of the heat collection and transfer conduit of collector X in FIGS. 14 and 15 which includes the outer tube 360 in which is axially mounted the inner tube 362 spaced radially therefrom to provide a dead air insulating space with the tubes mounted within an annular flange in a similar manner as housing 326 and clear plates 344 and 350 in FIG. 14. Extending axially within the inner tube 362 is the tubular support 364 mounting spaced fins identical to fins 358. The support 364 is mounted within the tube 362 by means of one or more hangers 366 connected to the tube 362.

In FIG. 17 is shown a further embodiment of a fluid collection and transfer conduit which includes the clear tubular member 367 in which is axially mounted the tube 368 by means of one or more support legs 370 similar to FIG. 14. The clear tube is mounted in a annular flange similar to that of FIGS. 14 and 16. Mounted within the tube 367 is the arcuate reflector 369 positioned above the tube 368 whereby the sun's rays are refocused from reflectors such as those shown in FIGS. 9, 10 and 15 and strike the tube 368.

Having thus described the invention, what is claimed as new and desired to be secured by Letters Patent is:

1. A solar energy tracking and collector apparatus comprising:
   (a) at least one collector including elongated reflective means having a parabolic surface in cross-section,
   (b) a heat collection and transfer conduit carried by said reflective means in the area of the focus of said reflective means for collecting solar energy reflected from said elongated reflective means,
   (c) said conduit having at least a portion thereof as transparent,
   (d) a fluid in said conduit,
   (e) an elongated member for absorbing solar energy mounted within said fluid within said conduit and extending throughout said conduit and spaced from the inner surfaces of said conduit, whereby solar heat transfers from said absorbing means outwardly to said fluid,
   (f) said conduit having an inlet at one end, and
   (g) an outlet at the other end,
   (h) said inlet connected to an inlet manifold and
   (i) said outlet connected to an outlet manifold
   (j) means for moving said fluid through said intake manifold, over said elongated absorbing member in said conduit, through said conduit and said outlet manifold, and
   (k) means for rotating said collector about a longitudinal axis thereof, said means for rotating comprising pulley and cable elements located between said inlet header and said absorber on said inlet conduit.

2. The apparatus of claim 1 further characterized by
   (a) a multiplicity of energy absorbing fins, and
   (b) means mounting said fins on said elongated member and within said conduit.

3. The apparatus of claim 1 in which said parabolic reflective means is a one piece member with the area of focus thereof and the conduit therefore positioned within the extent of said one piece parabolic member.

4. The apparatus of claim 3 in which said conduit is stationary and said collector rotates about the longitudinal axis of said conduit.

5. The apparatus of claim 1 in which said means for moving a fluid is a fan.

6. The apparatus of claim 1 in which said means for moving a fluid is a pump.

7. The apparatus of claim 1 in which said collector has a jacket mounted on the under surface thereof and in which insulative material is contained.

8. A solar energy tracking and collector apparatus comprising:
   (a) at least one collector having elongated reflective means having a parabolic surface in cross-section,
   (b) a heat collection and transfer conduit carried by said reflective members in the area of the focus of said reflective members,
   (c) a fluid in said conduit,
   (d) said conduit having an inlet at one end, and
   (e) an outlet at the other end,
   (f) an elongated heat absorber transfer member mounted longitudinally within said fluid within said conduit,
   (g) said inlet connected to an inlet manifold, and
   (h) said outlet connected to an outlet manifold (i) means for moving a fluid through said intake manifold over said heat elongated absorber transfer member in said conduit through said conduit and said outlet manifold whereby heat is transferred from said heat absorber member, and (j) means for rotating said collector about a longitudinal axis thereof, said means for rotating comprising pulley and cable elements located between said inlet header and said absorber on said inlet conduit.

9. A solar energy tracking and collector apparatus comprising:

(a) at least one collector including an elongated reflective means having a parabolic surface in cross-section, (b) a transparent plate connected at its edges within the parabolic surface of the reflective means and forming a conduit between said plate and the parabolic surface of the collector, (c) an elongated heat absorber member mounted within said conduit, (d) said conduit having an inlet at one end, and (e) an outlet at the other end, (f) said inlet end connected to an inlet manifold and (g) said outlet connected to an outlet manifold, (h) means for moving a fluid through said intake manifold, through said conduit over said elongated heat absorber member and through said outlet manifold, and (i) means for rotating said collector about a longitudinal axis thereof, said means for rotating comprising pulley and cable elements located between said inlet header and said absorber on said inlet conduit.

* * * * *